(12) United States Patent
Blair et al.

(10) Patent No.: US 7,787,974 B2
(45) Date of Patent: Aug. 31, 2010

(54) INDEPENDENT SOURCE RECORDING

(75) Inventors: Christopher Douglas Blair, South Chailey (GB); Richard Laurence Heap, London (GB)

(73) Assignee: Verint Americas Inc., Melville, NY (US)

(*) Notice: Subject to any disclaimer, the term of this patent is extended or adjusted under 35 U.S.C. 154(b) by 1081 days.

(21) Appl. No.: 11/129,811

(22) Filed: May 16, 2005

(65) Prior Publication Data

US 2006/0150229 A1   Jul. 6, 2006

Related U.S. Application Data

(60) Provisional application No. 60/641,463, filed on Jan. 5, 2005.

(51) Int. Cl.
*G06F 17/00* (2006.01)
(52) U.S. Cl. ...................................... 700/94
(58) Field of Classification Search ............. 379/88.22, 379/112.01, 113; 381/119; 704/201, 207, 704/208, 246, 251; 700/94
See application file for complete search history.

(56) References Cited

U.S. PATENT DOCUMENTS

| | | | |
|---|---|---|---|
| 5,590,171 A | 12/1996 | Howe et al. | |
| 5,774,567 A * | 6/1998 | Heyl | 381/119 |
| 5,835,572 A | 11/1998 | Richardson, Jr. et al. | |
| 5,923,746 A | 7/1999 | Baker et al. | |
| 5,982,857 A | 11/1999 | Brady | |
| 6,072,860 A | 6/2000 | Kek et al. | |
| 6,108,711 A | 8/2000 | Beck et al. | |
| 6,560,328 B1 | 5/2003 | Bondarenko et al. | |
| 2001/0040942 A1 * | 11/2001 | Glowny et al. | 379/88.22 |
| 2003/0078782 A1 | 4/2003 | Blair | |
| 2004/0019700 A1 | 1/2004 | Ilan et al. | |
| 2004/0057569 A1 | 3/2004 | Busey et al. | |

FOREIGN PATENT DOCUMENTS

| | | |
|---|---|---|
| EP | 0 989 720 | 3/2000 |
| EP | 0 989 720 A1 | 3/2000 |
| GB | 2 369 263 | 5/2002 |
| WO | WO 00/16207 | 3/2000 |

OTHER PUBLICATIONS

International Telecommunicaiton Unit, G.729; General Aspects of Digital Transmission Systems; Mar. 1996.*
UK Search Report in GB0600088.9 dated Jun. 14, 2006.

* cited by examiner

*Primary Examiner*—Andrew C Flanders
(74) *Attorney, Agent, or Firm*—Lawrence A. Aaronson, P.C.

(57) ABSTRACT

Systems and methods for recording multiple channels of incoming data. A system and method can receive data streams from a number of sources and distribute the data streams to a number of users. The plurality of data streams are stored in a storage device for later redistribution.

25 Claims, 10 Drawing Sheets

INDEPENDENT SOURCE RECORDING

TECHNICAL FIELD

This relates in general to computer-telephony integration, and more particularly to independent recording of audio streams from multiple sources.

BACKGROUND

Although electronic messaging applications (e.g., electronic mail (e-mail), instant messaging, chat applications) have revolutionized communication, in many business environments the telephone remains the predominant mode of communication. For example, trading rooms often have pressure to communicate information and receive a response over telephones in order to be as close to real time as possible and to avoid the delay introduced by most electronic communication media.

In particular, the activity in trading rooms is considered much more "peaky" than in traditional call centers. Bursts of frenzied activity can follow major events and these may last from a few seconds to a few hours. During these periods, the activity levels can be many times higher than the average load on the system. A recording system can be used in trading rooms in order to record transactions as they are occurring. Among other uses, recording systems can be helpful in recording transactions during frenzied periods of time, and should be able to perform reliably during such times. A reason for the reliability of a recording system is because during these brief "panics" traders may tend to ignore their computer systems and rely on the outcry going on around them to stay in touch. Trades are done verbally and scribbled down or remembered so that when the market calms down again, they can be entered into the computer systems. This can cause errors to arise. Thus, a recording system can help to sort out the trades that occurred.

As one example of a previous recording approach, recording capacity was connected to each trading desk rather than to the trunks entering or leaving the building. This is at least in part because the unusual topology of trading room systems (having more lines out of the building than there are desks) makes it more economical to connect recording capacity to each trading desk, and the major trading room system vendors have provided connectivity points to support such an arrangement.

Traditionally, recording systems have been priced according to the number of recording channels—which in a trading room system could all be live at once. This is because digital signal processing requirements, storage requirements, and cabling and interfacing costs have been proportional to the number of channels being recorded.

Recording systems have been developed to minimize the channels being recorded by mixing together the data streams received by each trader. This led to the development of recording systems capable of mixing up to 8 input channels into a single composite recording channel. The techniques used for this included normalizing the signals with automatic gain control, mixing and then compressing the resultant signal.

Because the mistakes and disputes that arise within a recording system can be due to over-hearing or mis-hearing, the availability and quality of the recording can be used in resolving the dispute correctly. As an illustration, in a compliance recording environment, those data streams that could have been heard and therefore acted upon are recorded. These items can include speech not originally intended for the handset/microphone that it was heard on—e.g., trader hears "Buy" and acts on it even though it was being shouted into the other handset. Also, such recording systems were used to record even the first syllable of each "call"—since this call may be just a single word, shouted to the other party. Thus, trading room peculiarities led to, among other things, recording systems which were deliberately over-sensitive and hence recorded much low level audio that may well be just background noise as well as recording the main conversation on a line. Moreover, some recording systems used look-ahead buffers which enabled the system to filter out short spikes of electrical or acoustic noise, while still recording audio longer than a few tens of milliseconds.

SUMMARY

In accordance with the teachings provided herein, systems and methods for operation upon data processing devices are provided in order to overcome one or more of the aforementioned disadvantages or other disadvantages concerning recording multiple channels of incoming data. As an example of a system and method, multiple channels of incoming data (e.g., audio data) can be independently recorded, while reducing the number of superfluous copies of the multiple channels of incoming data. As another example, a system and method can be configured to provide for recording mixer settings for each of a number of users, such that the audio heard by each of the users can be recreated upon playback.

As another example, a device can be configured for recording multiple channels of incoming data. The device can receive audio, video and other data streams from a number of sources and distribute the data streams to computers based upon identifiers (e.g., addresses) associated with the workstations. The device reproduces the plurality of data streams, and transmits the data streams along with a recipient address for independent storage in a storage device. One or more workstation addresses are also stored with a data stream in order to determine the original recipient(s) of the data stream. Stored data streams are retrieved from the storage device through use of a recipient workstation address that is stored with a data stream and are provided based upon a request.

As another illustration, a system and method can be configured to receive multiple audio sources, the audio sources being respectively associated with inputs and outputs from the plurality of users; distribute the plurality of audio sources respectively to workstations associated with the users; and, record the plurality of sources for subsequent playback, thereby reducing superfluous recordings of a particular source among the plurality of audio sources.

One or more computer readable media can be used that contain software program code for recording voice traffic associated with a plurality of operator workstations. For example, a computer readable medium can contain distribution logic that is configured to receive multiple audio streams, the audio streams being associated with at least one of a number of operators. Distribution logic can further be configured to distribute the audio streams to those operators associated with the plurality of audio streams. Recording logic on the medium can be configured to reproduce the audio streams and record the audio streams independently for subsequent playback, thereby avoiding the creation of a number of superfluous copies of the plurality of audio streams.

DETAILED DESCRIPTION OF THE DISCLOSURE

Figure 1:
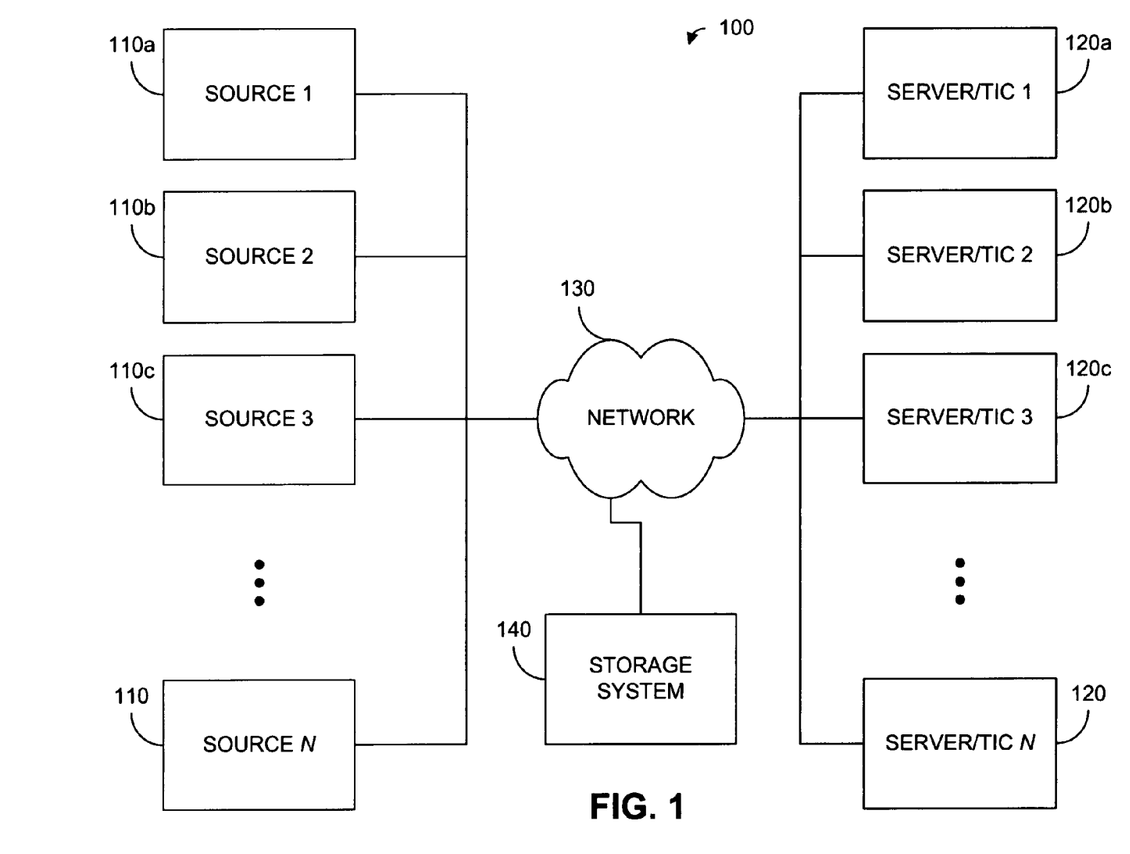
FIGS. 1 and 2 are block diagrams illustrating an example of a trading room environment.

FIG. 1 illustrates a configuration 100 of a trading room environment. Within the trading room environment, configuration 100 can include a number of sources 110a-c, which can send content to a number of servers 120a-c via a network 130. However, it should be understood that the configuration 100 can be used with many other environments, such as a call center environment.

Servers 120a-c can include recording logic for tapping the streams of data passing through servers 120a-c, as well as distribution logic for distributing the signals coming into servers 120a-c. Recording logic can communicate with the storage system 140 via the network 130.

Figure 2:
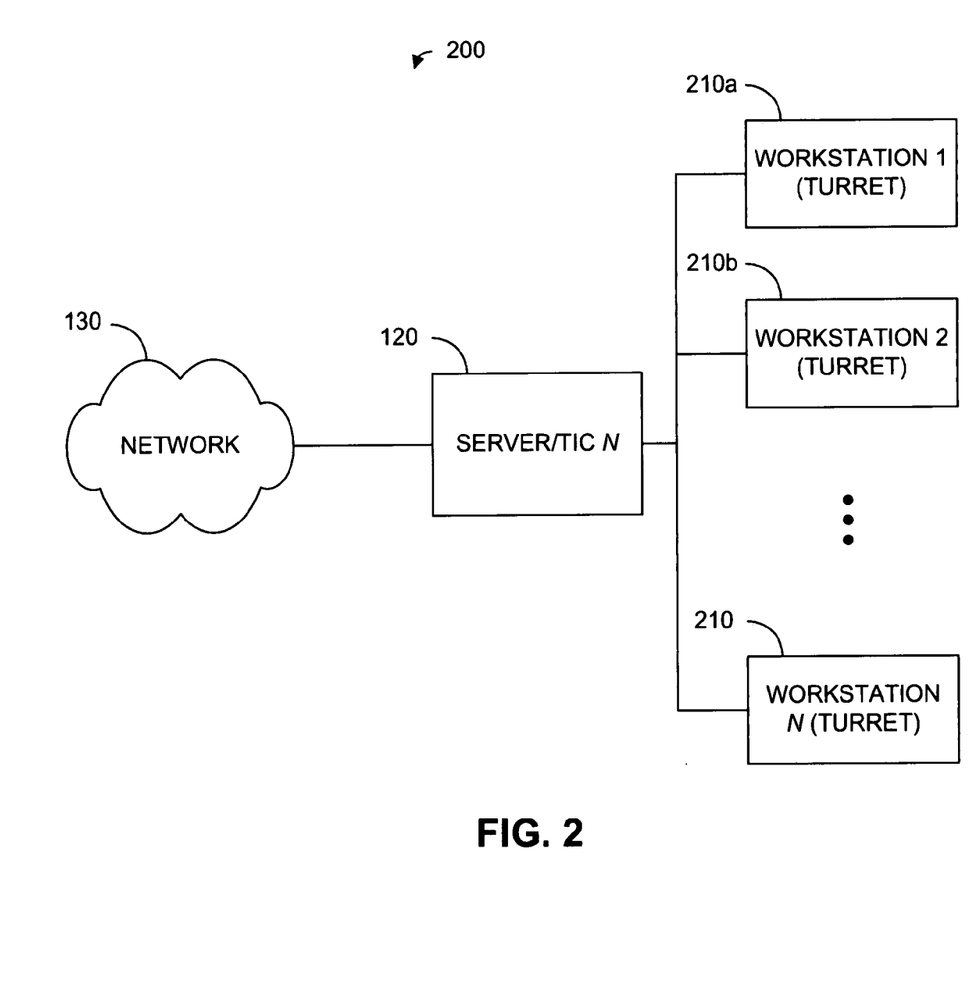

As shown in FIG. 2, upon a server 120 receiving source data streams, the server 120 can distribute the data streams out to a number of workstations 210a-b (e.g., turrets or terminals). The workstations can reside on a user's desk in one embodiment of the present disclosure. The trader uses the workstation to consummate trades, such as, for example, stock trades, commodity trades, bond trades, etc. However, it should be understood that a workstation can have many different types of configurations. As an illustration, a workstation can comprise a combination of the personal computer residing on the trader's desk and the turret (e.g. telephone system) that the trader uses to send or receive information to or from outside sources. It should be noted that a workstation can be the turret alone.

As mentioned above, this type of trading is subject to high volume peaks, which can occur shortly after the release of information. Moreover, because potentially large amounts of money are at stake, the server and recording logic can be configured to be reliable. For example, the server and recording logic can be configured such that a portion of the system could be broken, while still enabling the server and recording logic to operate properly.

Distribution software on the server can be configured to distribute a number of data streams to software installed and running on the users' workstations. While some of the data streams can be broadcast or multicast type data streams which are sent to the workstations connected to the server, other data streams can be addressed to a particular user. The former can be the case for newscasts, such as, for example, Headline News™, supplied by CNN, of Atlanta, Ga., while the latter can be the case with sources such as telephone calls. The sources can comprise myriad different entities. In the trading room environment for example, the source can be Headline News™, Lloyd's of London, a brokerage house, a clearing house, etc.

Distribution logic can be used on a server for sending information from the users on workstations 210a-b to various sources via the network. For example, the server can receive messages from the workstations 210a-b, translate the messages, and if necessary, send the information across the network 130 to a source 110. These messages, for example, can describe an outbound data stream, such as an audio data stream. It should be noted that the data stream can appear continuous to the trader, though it may actually be transformed into messages (e.g. packets). However, the messages could also be a call connection request, or some other sort of data transfer. Translation of data can occur when the connection is, for example, a telephone call, because the message may need to be converted from an internet protocol (IP) which transports the messages from the workstation to the server to another protocol, such as SS7 (C7), for transport across a public switched telephone network (PSTN).

Recording logic can be used to tap the individual source information streams passing through the server. Recording logic sends parallel signals to the storage system. The storage system in this embodiment comprises two storage areas, primary storage, and secondary storage. The primary storage receives the data streams from recording logic and immediately writes each of the data streams to memory independently. The secondary storage receives each of the data streams from recording logic, similarly to the primary storage.

In addition to the data streams, the secondary storage can receive a "heartbeat" signal from the primary storage. The heartbeat signal indicates that the primary storage is functioning properly. In one embodiment of the present disclosure, the secondary storage writes each of the data streams to a buffer (volatile memory). After a period of time of receiving the data streams and receiving the heartbeat signal from the primary storage for the full duration of that period of time, the secondary storage can be configured to delete (or rewrite) the buffer. However, if the heartbeat signal is not received by the secondary storage, the secondary storage may begin writing the data directly to non-volatile memory, until the heartbeat signal returns. An alarm may also be raised so that the problem with the primary storage system can be fixed quickly. Such an arrangement provides the storage system with reliable storage. Many different types of storage devices can be used for archiving large amounts of data, such as Centera, available from EMC Corp. of Hopkinton, Mass., or Tivoli Storage Manager available from IBM Corp. of White Plains, N.Y.

Alternatively, it should be noted that each of a primary storage area and a secondary storage area could immediately write the data to non-volatile storage, and at some later point the secondary storage could delete the data upon determining that the data streams were successfully written by the primary storage area. Also, it should be noted that a storage area network (SAN) may be used as the storage system 140.

As described above, an operating environment can be a "trading room" for trading stocks, bonds, commodities, etc., in which a trader is taking and/or making calls to other traders, brokerages, banks, etc., which may have trades to make (buy or sell), information about accounts, information about trades, etc. In such an environment, it would not be uncommon for a calling agent, during the course of a few seconds, to make several calls, each of extremely short duration. In order to provide consistent and acceptable service to such traders, a system can be configured to record the activities at each trader desk, in order to properly sort out trades, and even allocate fault correctly by enabling playback of a session including peak activity.

Figure 3:
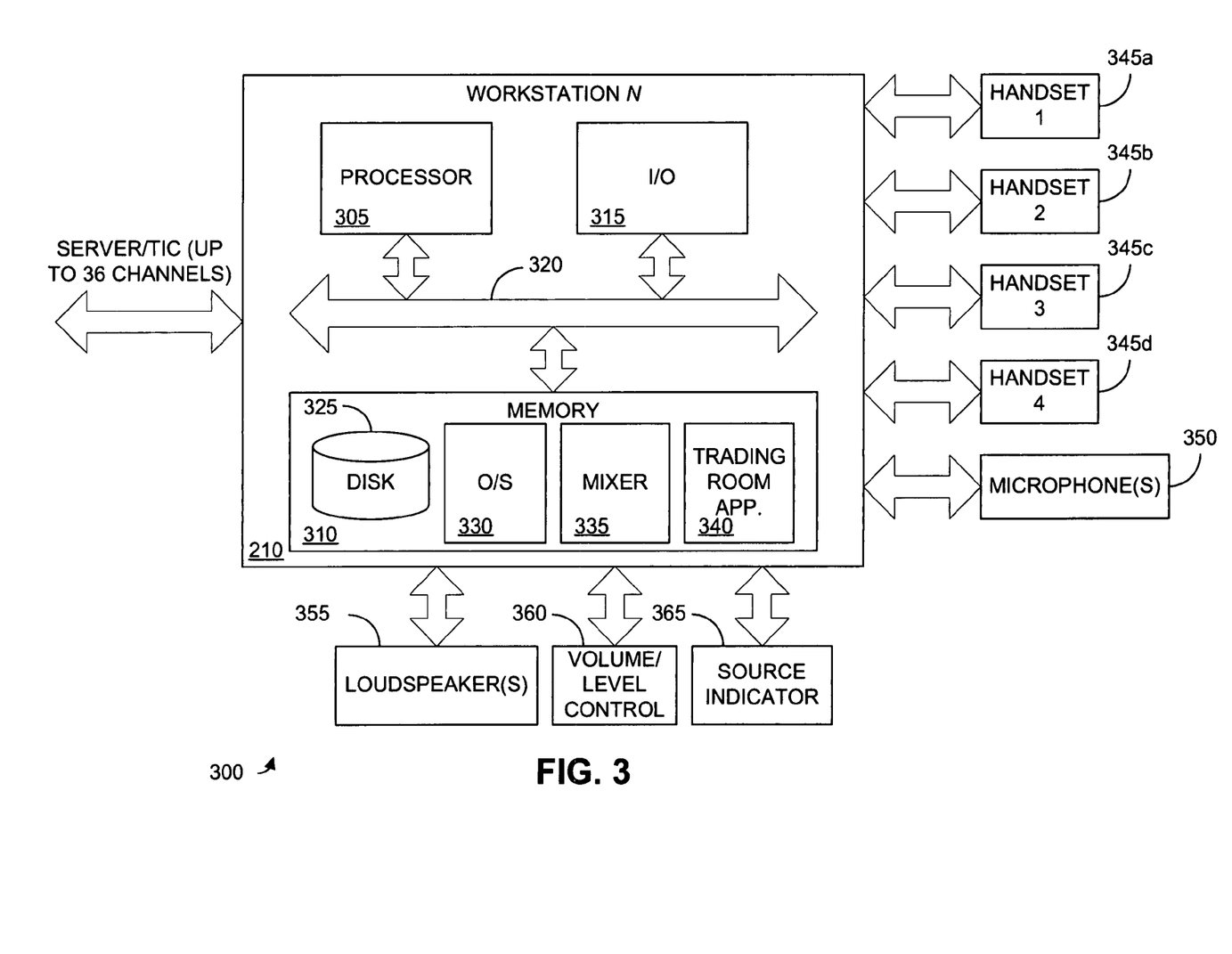
FIG. 3 is a block diagram illustrating an embodiment of a workstation architecture.

A workstation 210, as shown in FIG. 3, can include hardware and software mounted thereon. A workstation can be a computer, such as a turret available from IPC Information Systems, LLC of New York, N.Y.

The hardware used can include a processor 305 which can be used to operate a real-time operating system or an industry standard O/S such as Windows. The hardware can further include a memory 310, which may include a hard disk 325, and I/O interfaces 315, connected together by a bus 320. Different hardware configurations may be used without departing from the spirit and scope of the present invention.

An example of a server can include a terminal interface card (TIC) 120 such as available from IPC Information Systems, LLC of New York, N.Y., as part of an overall trading system. The terminal interface card 120 can receive and distribute data for up to 16 workstations 210. Moreover, each workstation 210 can receive up to 36 channels of data. Further, the data streams sent to the workstation 210 can be received from a variety of different sources. For example, in some cases, a user may receive a signal from a private virtual circuit (PVC) while communicating with another brokerage house, a Headline News™ or Bloomberg™ stream to keep track of news affecting the markets, a telephone call, among many others.

Each of these data streams may potentially be addressed to a particular trader workstation 210. Thus, the server 120 also acts as a centralized router for the data streams as they enter the trading floor and are distributed to the correct workstations 210.

With reference to FIG. 3, memory 310 includes an operating system 330 which is executable by the workstation 210. Memory 310 further includes a trading room application 340 which is operable to be executed by the processor 305. As is known in the art, the trading room application 340 can include a graphical user interface having button representations. Upon selection, these button representations connect the workstation to a telephone line. The telephone line can be directly connected to a counterparty (e.g. a source) or can automatically dial a pre-defined number based on the button representation pressed. Moreover, the graphical user interface of the trading room application 340 includes input for a plurality of microphones, a mixer having inputs which enable the trader to mix the incoming audio channels and adjust output levels of the incoming audio channels for output on one of several loudspeakers.

As may be understood, multiple applications 330, 335, 340 may be used by the trader on the workstation 210 in the course of trading. A configuration of the operating system 330 can include systems such as a Linux operating system available from RedHat, Inc. of Raleigh, N.C.

The trader's workstation 210 can be connected to many different types of peripheral devices 345-365 that enable the trader to efficiently perform his/her job. The peripheral devices can include multiple telephone handsets 345*a-d*. It should be noted that the telephone handset peripherals 345*a-d* can include both a speaker and a microphone, and therefore enable bidirectional communication with remote users via the server.

Other peripheral devices can be unidirectional peripheral devices 350, 355. These are unidirectional devices in the sense that they either transmit data or they receive data, but cannot do both. For example, a microphone 350 connected to the workstation 210 enables the trader to communicate information, often to other traders on the floor, via the server 120. However, the microphone 350 does not enable the trader to receive a data stream from other traders. Similarly, a loudspeaker 355 enables the trader to receive incoming data streams from other traders via the server, but does not enable the trader to send information to the other traders.

Still other peripheral devices such as a volume/level control 360 enable the trader to adjust the volume and settings of the signal sent to the loudspeaker(s) 355. A source indicator 365 driven by the trading room application 340 alerts the trader to an active data stream. An active data stream, for example, could be a data stream that has a signal being generated to the speaker by the trading room application 340. The source indicator can indicate that an amplitude of the signal exceeds a squelch threshold. It should be noted that the volume/level control 360 and the source indicator in various embodiments of the present disclosure can be implemented in hardware, software, or any combination thereof.

Figure 4:
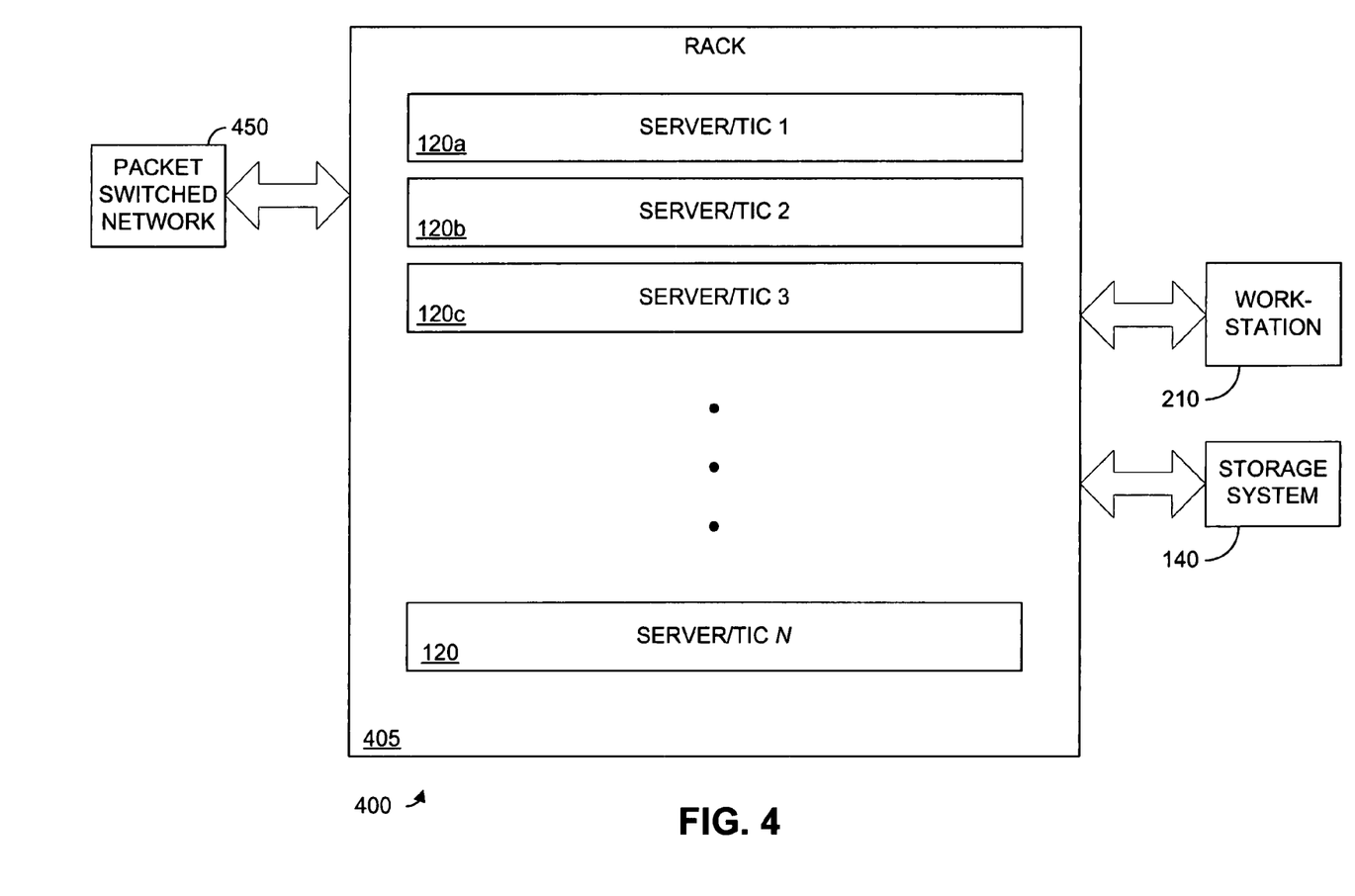
FIG. 4 is a block diagram illustrating an embodiment of a server architecture.

With reference to FIG. 4, hardware used on the rack 405 can include a number of terminal interface cards 420, available from IPC Information Systems, LLC of New York, N.Y. Many terminal interface cards 120*a-c* can be included in a rack 405, each one supporting 16 workstation turrets and switching the audio to and from them. The rack provides power to each of the terminal interface cards and a data bus (not shown) with which to communicate with the rest of the system. The terminal interface card 120 operates to route the incoming data streams, and will be discussed in further detail with reference to FIG. 5. Different hardware configurations may be used without departing from the spirit and scope of the present invention.

With continued reference to FIG. 4, the I/O interfaces include interfaces to a network. An embodiment of the present disclosure can include interfaces to a packet-switched network 450. The packet-switched network 450 receives the source data via several line cards, which are operable to interface, in various embodiments, to a private virtual circuit, the PSTN, and fixed tuner source. Each of these devices source at least one audio data stream for one of the workstations 210 coupled to the server 120.

The server receives the sources, determines the correct recipient(s) of the audio data stream, and routes the audio data stream to that/those recipient(s) via a workstation interface, as is known in the art (e.g., ethernet). The server also taps each of the audio data streams in accordance with configuration data contained in the data store 540, and sends the data to a storage system 140 via a storage system interface. Although shown separate, the storage system interface and packet switched network interface, in various embodiments of the present disclosure, are the same network interface. Furthermore, in various embodiments of the present disclosure, the server 120 is operable to interface with the storage system to subsequently retrieve data for one of the traders. In such an embodiment, the storage system itself would act as a data source for the workstation.

A terminal interface card 120 can include the signal processing power which enables the card 120 to support audio transmission to and from the turrets that it controls. The terminal interface card 120 is responsible for receiving the incoming data streams from each of the myriad data sources, and routing the data streams to the appropriate destination. Furthermore, the terminal interface card 120 includes software operable to tap the data streams and send each of the data streams independently to a storage system. The terminal interface card 120 further includes software for compression of the data streams prior to sending the data streams to the storage system and/or to the workstations 210.

Figure 5:
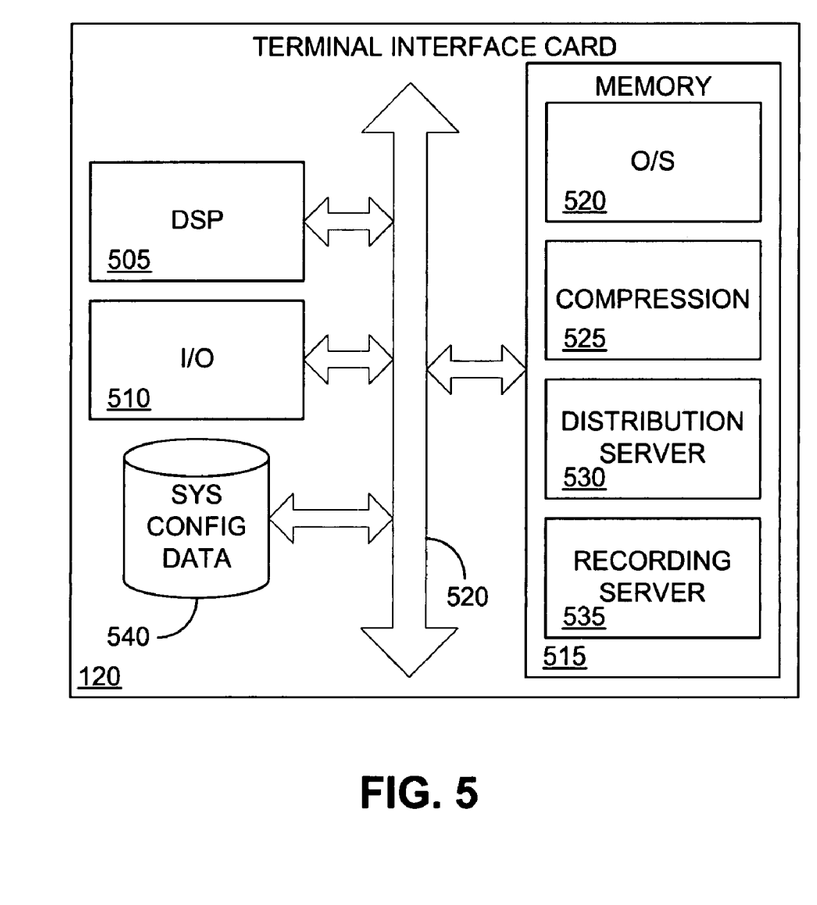
FIG. 5 is a block diagram illustrating a server architecture.

With reference to FIG. 5, the terminal interface card 120 can include a digital signal processor (DSP) 505, I/O 510 and memory 515 coupled together by a data bus 520. The DSP 505 can be responsible for the signal processing power of the terminal interface card 120. It should be understood that different hardware configurations may be used without departing from the spirit and scope of the present invention.

With continued reference to FIG. 5, memory 515 includes an operating system 520 which is executable by the server 120. The operating system 520 can be a lightweight real-time kernel. Memory 515 further includes compression software 525, distribution server software 530 and recording server software 535, each of which are executable by the DSP 505. The I/O 510 of the terminal interface card 120 further includes a network interface device, such as an ethernet interface. As is known in the art, the network interface device can include driver software such as the distribution server software 530, enabling the server to interface with the network interface 510. The system configuration data store 540 includes the information which facilitates a recording server 530 to tap the data streams passing through the terminal interface card 120, and send the data streams to a storage system 140, as is known in the art.

The distribution server software 530 enables the terminal interface card 120 to distribute the incoming and outgoing data streams to any of a number of workstations 210. The recording server software 535 enables the terminal interface card 120 to tap each of the incoming and outgoing data streams, and send the tapped data streams to a storage system 140 in accordance with the data from the system configuration data store 540.

The compression software 525 enables the terminal interface card to compress the incoming and outgoing data streams to use less bandwidth in transferring each of the data streams. Moreover, the compressed data streams sent to the storage system 140 occupy less disk space than data streams which have not been compressed, and therefore remove some of the processing burden from the storage system 140.

It should be noted that each data stream is recorded such that both the destination and source are recorded for each of the individual data streams. Previously a system would have recorded an audio stream purely because it was destined for, e.g. speaker 1, of turret/workstation n. In various embodiments of this disclosure, the stream is recorded if it comes from a source that is not already being recorded on one or two other recording channels. A stream could also be recorded if it comes from a source that is not already being recorded on "n" recording channels, where n can be configurable based on the degree of fault tolerance desired). If data from a particular source is already being recorded on "n" recording channels, the storage system 140 can decide to not store the data again. Instead, the storage system 140 merely notes that this speaker and/or destination was connected to a particular source at a particular time.

When a user (e.g., a trader) requests replay of a particular speaker at a particular time, the storage system 140 retrieves the source associated with the audio from that speaker and plays it from the channel that the storage system 140 did record. It is the reliable and immediate inclusion of the source identification within the communication between terminal interface card 120 and storage system 140 that enables the storage system 140 to make decisions to effectively dispose of audio that would previously have been recorded. This audio would have been recorded because the storage system could not have been sure that the audio was being recorded already, since the source of the audio in real time may be unknown.

It should be recognized that there is a distinction between a telephone call (e.g., two streams: one tx one rx) and an audio stream (uni-directional). The storage system 140 replays a recording by searching for the individual streams that made up a call. Hence by recording each handset's mouthpiece, all microphone inputs and each external line input separately and without redundancy, the storage system 140 does not record speaker outputs or handset outputs. However, the storage system and a mixer can reconstitute any call by mixing the appropriate inputs/sources at the levels recorded. Hence, the source of every audio stream is recorded (e.g., immediately and reliably). This is achieved by using the terminal interface card to pass the source information along with the audio streams themselves. Thus, for example, when the storage system 140 receives the audio streams and the data about those audio streams, the storage system 140 can be used to perform recording optimization as disclosed herein.

Figure 6:
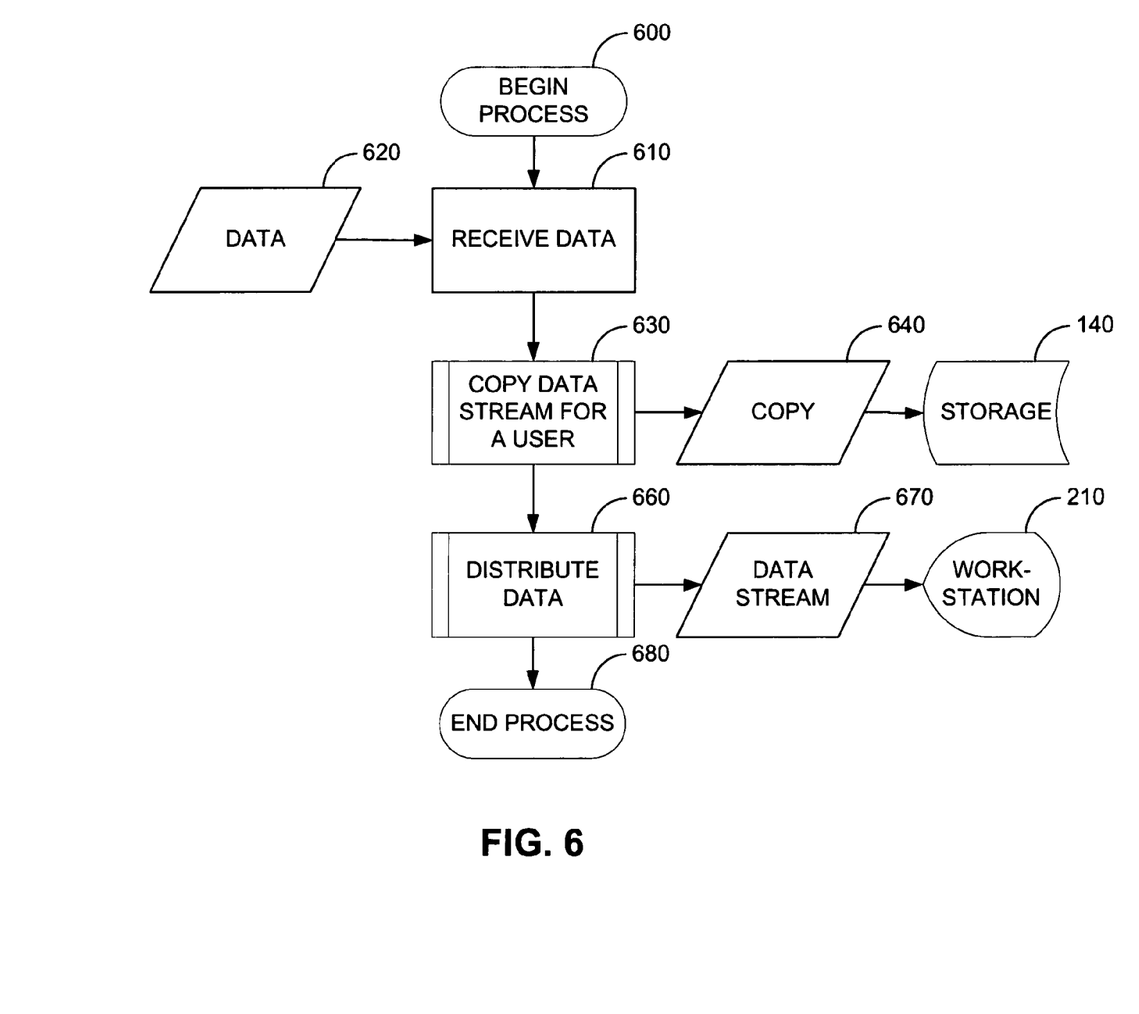
FIG. 6 is a flowchart illustrating an embodiment of a process for independently recording source data.

With reference to FIG. 6, shown is a flowchart illustrating an embodiment of a process used by the server 120 of the present disclosure. The process begins at step 600. In step 610, the server 120 receives data 620 from the data sources. As described above, each of the data sources 110 are operable to produce at least one audio data stream for a workstation. The data stream from the data sources 110 in various embodiments of the present disclosure can arrive in a variety of audio formats including G.711 (A or µ-law), G.729 over a variety of streaming methods including Voice over IP (VOIP) or synchronous E1 or T1 pipes or multiplexed audio buses such as SCSA or MVIP. Based on the various formats, the server includes software operable to handle each of the formats, as known to those skilled in the art.

At step 630, the server 120 copies each of the data streams for a user and sends the copy 640 to a storage system 140. As described above, the copy process of step 630 can involve reproducing (e.g. tapping) the incoming data stream such that a transient copy 640 of the data stream is made to memory 410 on the server 120. The transient copy 640 is then transferred via an IP network, in an embodiment of the present disclosure, to a storage system 140. Upon transferring the transient copy 640, the server 120 removes the transient copy from memory 410. Optionally, it may hold onto the transient copy until positive acknowledgement of receipt is received e.g. TCP/IP acknowledgment. Alternatively it may use a fire and forget scheme such as user datagram protocol (UDP).

In step 660, the server 120 distributes the data streams to recipient workstation(s) 210. The data streams 670 can be distributed after inspecting the incoming data streams 620, and determining for which terminal/workstation 210 each of the data streams 620 is intended. As mentioned above, some of the data streams 620 are broadcast. It should be noted that the term broadcast is used herein to refer to the transmission of source data to multiple recipients. However, the term broadcast is not intended to limit the scope of the disclosed systems and methods to a broadcast wherein the same signal is being sent to multiple machines. Instead, broadcast as used herein can encompass the source data being sent as multiple point-to-point transmission to multiple workstations. Alternatively, the source data could be multicast to the multiple workstations. It should be further noted that the broadcast signals are distributed from the terminal interface card 120 as individual packets addressed to the workstations 210 which are connected to the terminal interface card 120. Other data streams 620, such as a telephone call, are recipient specific. In trading rooms, many telephone calls can be multi-party, with several traders listening and/or talking. The data streams 670 are transferred to the workstations via an IP network. It should be noted that any type of addressable network protocol and topology could be used in conjunction with the present disclosure. At step 680, the process ends.

Figure 7:
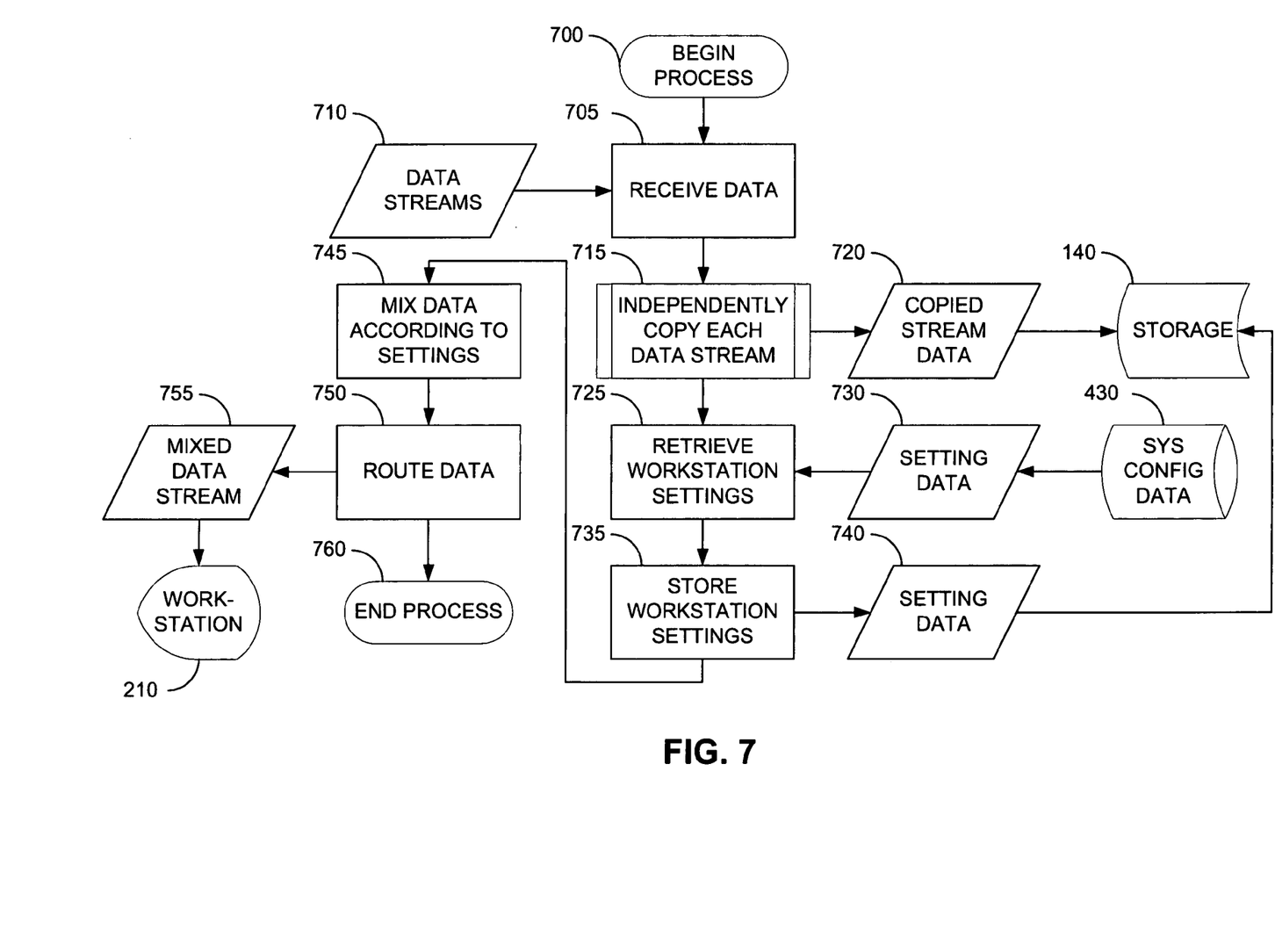
FIG. 7 is a flowchart illustrating an alternative embodiment of a process for independently recording source data.

With reference to FIG. 7, shown is a flowchart illustrating a process used in an embodiment of the present disclosure. The process begins at step 700. In step 705, the server 120 receives numerous data streams 710 from a variety of data sources. As noted above, in some embodiments of the present disclosure, the data streams 710 are received via an IP network. However, in other embodiments, the data streams 710 are received via any of a variety of network protocol and topology. In yet further embodiments of the present disclosure, the data streams are received via a fixed tuner source operable to tune television, radio, etc.

After receiving the data stream the server 120 independently copies each of the data streams 710 received, as shown in step 715. The server 120 can make a transient copy of the data streams 710, and compresses the transient copy of each the data streams. Upon compressing the data streams, the server 120 transmits the transient compressed copy of each of the copied data streams 720 to a storage system 140. As described above, the storage system can have a mirrored architecture, thus removing the importance of the server sending the copied data streams 720 to two different storage systems. However, as further described above, in some embodiments of the present disclosure, it remains beneficial for the server 120 to copy the data streams in parallel, such that if one storage system goes down, the other storage system will store the data. It should be understood that the data streams are further stored with a time stamp, and addresses to whom the data streams were being distributed to. Thus, each of the data streams sent to a particular user can be retrieved and evaluated as needed.

In step 725, the server 120 retrieves the workstation settings 730 from the system configuration data store 430. It should be recognized that in various architectures of the present disclosure, the workstation settings 730 are distributed, in that each of the workstations 210 stores its own settings, rather than a centralized architecture described with respect to FIG. 7. In such a distributed architecture, the settings would be retrieved from the individual workstations, as would be understood in the art, rather than from a centralized system configuration data store 430.

Upon retrieving the workstation settings 730, the server sends the workstation settings 740 to the storage system 140, as shown in step 735. The workstation settings 740 are stored such that they may later be retrieved and applied to the stored data streams 720. These stored settings also include a timestamp, such that these settings can accurately recreate a mixed data stream as heard by a user.

The server 120 then mixes the data streams in accordance with the workstation settings 730, as shown in step 745. The mixer can receive a number of level settings 730 from the workstation user, and mixes the data streams together at the levels specified by the settings 730, creating a mixed data stream. The server 120 then routes the mixed data stream 755 to a workstation 210, as shown in step 750. It should be understood that several mixed data streams 755 can be produced, and in one embodiment of the present disclosure, one of the data streams 755 is communicated to an associated workstation 210 in a specific time slot for the associated workstation 210. However, it should be recognized that there exist numerous multiplexing schemes in addition to the time division scheme described above, such as for example, frequency division and code division, among others. The process ends at step 760.

Figure 8:
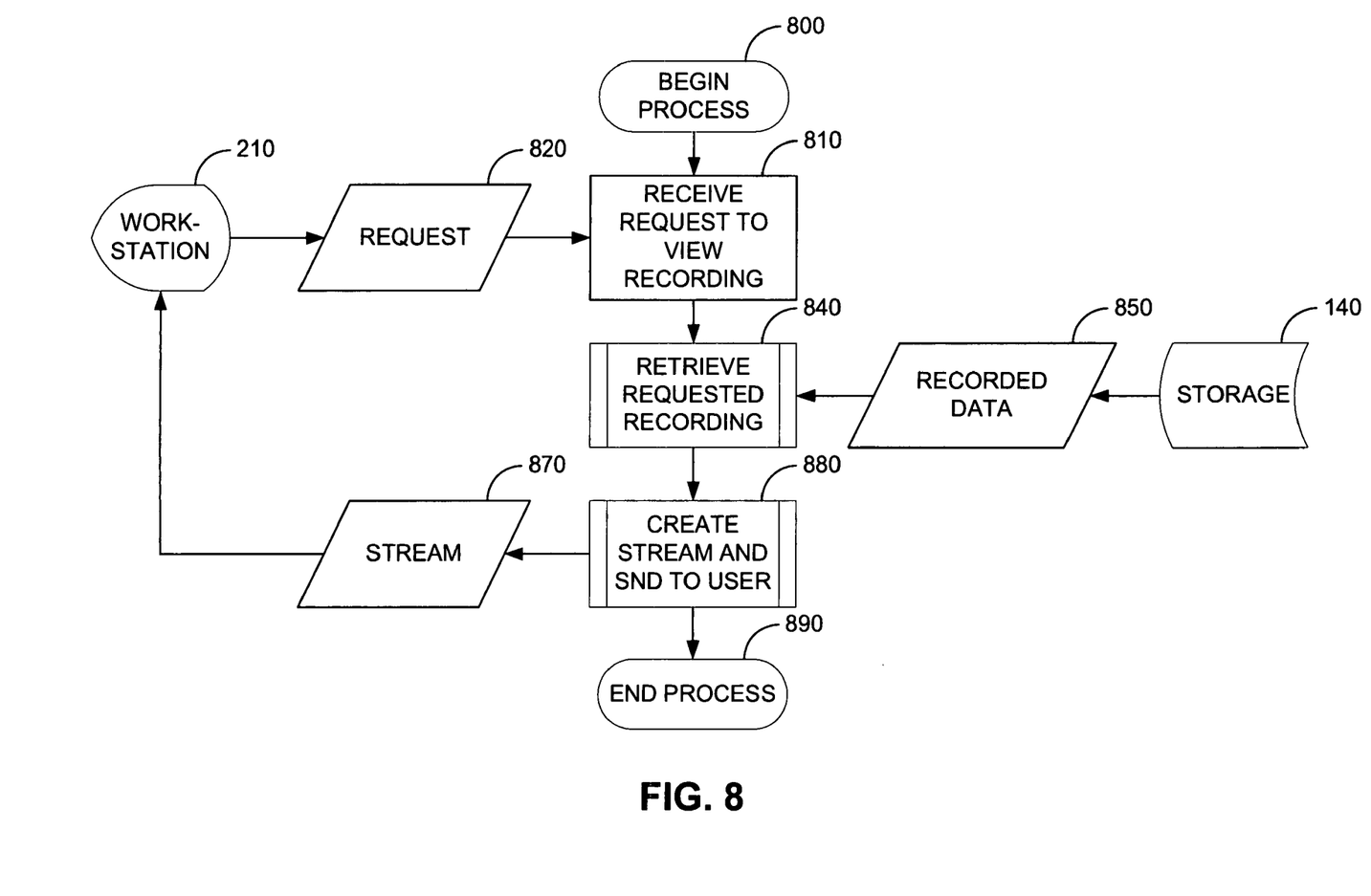
FIG. 8 is a flowchart illustrating an embodiment of a process for replaying stored data streams.

With reference to FIG. 8, shown is a flowchart illustrating an embodiment of a process used by a server for playback of a stored data stream. The process begins at step 800. At step 810, the server receives a request 820 from a workstation 210 to review a previously stored recording. Such a request can indicate a time period for which the user would like to retrieve a data stream related to his or her workstation along with the address of the workstation. However, it should also be recognized that a supervisor, or other authorized personnel, could retrieve a data stream associated with any of the users.

Upon receiving a request 820 to review a particular stored recording, the server retrieves the requested recorded data 850 from the storage system 140, as shown in step 840. In some embodiments of the present disclosure, the storage system 140 could begin streaming the data to the server 120, thus acting as a source sending another information data stream to the user. Alternatively, the storage system 140 could transfer the entire file for the specified range to the server 120, and the server could reconstruct the data stream for a particular user. The transfer is often performed over an IP network, however, it should be understood that any physical or logical network layout could be used.

In step 880, the server 120 creates the data stream 870 and sends the data stream 870 to the requesting workstation 210. The creation of the data stream 870 can entail assembling and decompressing the time-stamped packets retrieved from the storage system 140 and sending the packets to the workstation 210. The process ends at step 890.

Figure 9:
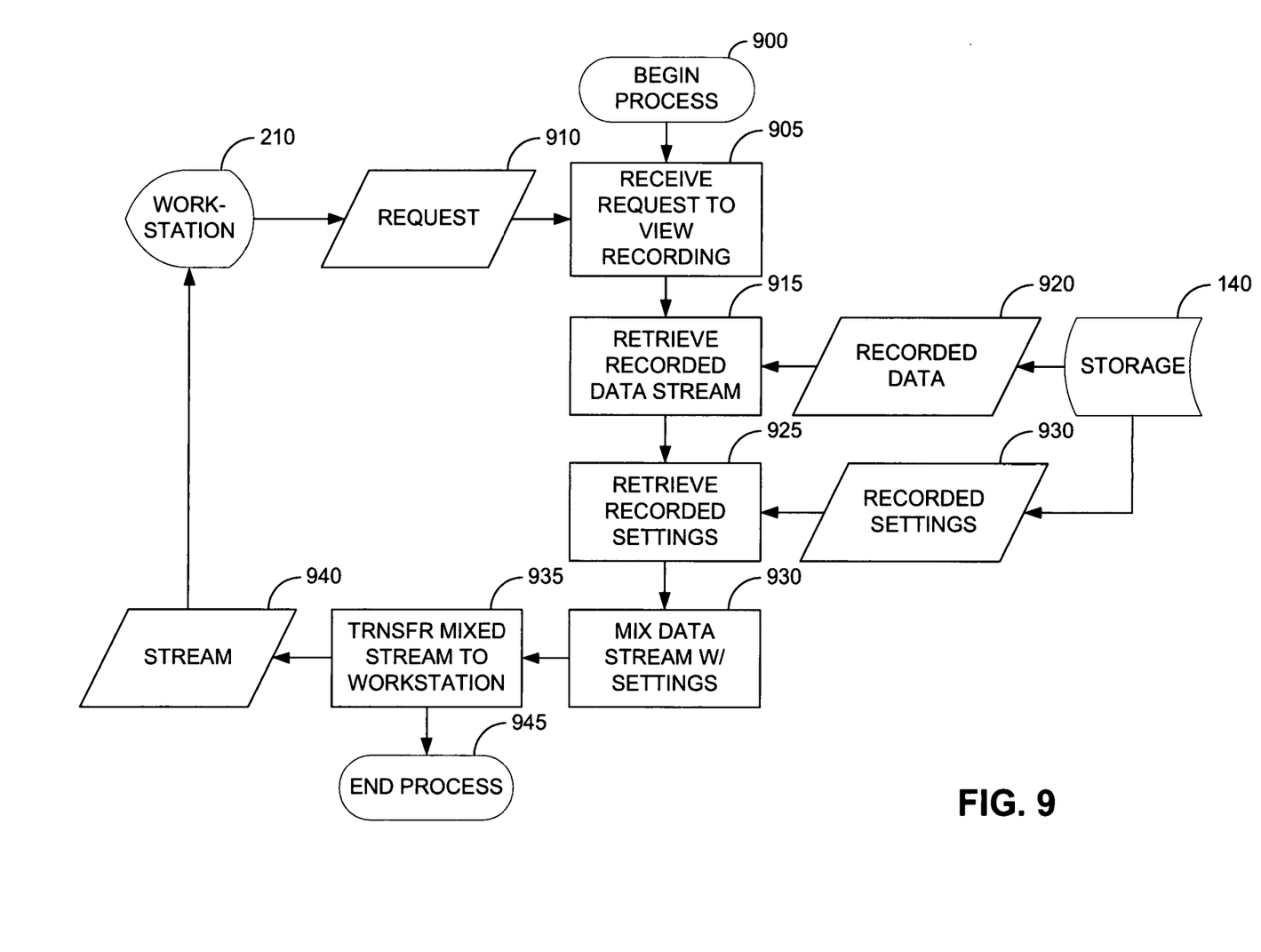
FIG. 9 is a flowchart illustrating a first alternative embodiment of a process for replaying stored data streams.

With reference to FIG. 9, shown is a flowchart illustrating an embodiment of a process used by the server to retrieve stored data streams to present to the user. The process begins at step 900. At step 905, the server 120 receives a request 910 from a workstation 210 to review a previously stored recording. Such a request can indicate a time period for which the user would like to retrieve a data stream related to his or her workstation along with an address associated with the workstation. However, it should also be recognized that a supervisor, or other authorized personnel, could retrieve a data stream associated with any of the users.

Upon receiving a request 910 to review a particular stored recording, the server 120 retrieves the requested recorded data 920 from the storage system 140, as shown in step 915. In some embodiments of the present disclosure, the storage system 140 could begin streaming the data to the server 120, thus acting as a source sending another information data stream to the user. Alternatively, the storage system 140 could transfer the entire file for the specified range to the server 120, and the server could reconstruct the data stream for a particular user. The transfer is often performed over an IP network, however, it should be understood that any physical or logical network layout could be used with respect to the present disclosure. In step 925, the server 120 retrieves the stored settings 930 from the storage system 140.

In step 930, the server 120 mixes the data stream in accordance with the settings 930 retrieved from the storage system 140. The settings 930 can comprise a level setting associated with each of the data streams 920 retrieved. Thus, each of the data streams associated with the particular workstation requested will be mixed into a mixed data stream at the level specified by the settings 930. Thus, the mixed data stream is substantially similar to an original data stream heard by the user in real-time.

In step 935, the server 120 transfers the reconstructed mixed data stream 940 to the workstation 210. The transfer of the reconstructed mixed data stream 940 can occur over an IP network, however, it should be recognized that there exist many logical and physical network topologies which are suitable for such an application, each of which is intended to be included within the scope of the present disclosure. The process ends at step 945.

Figure 10:
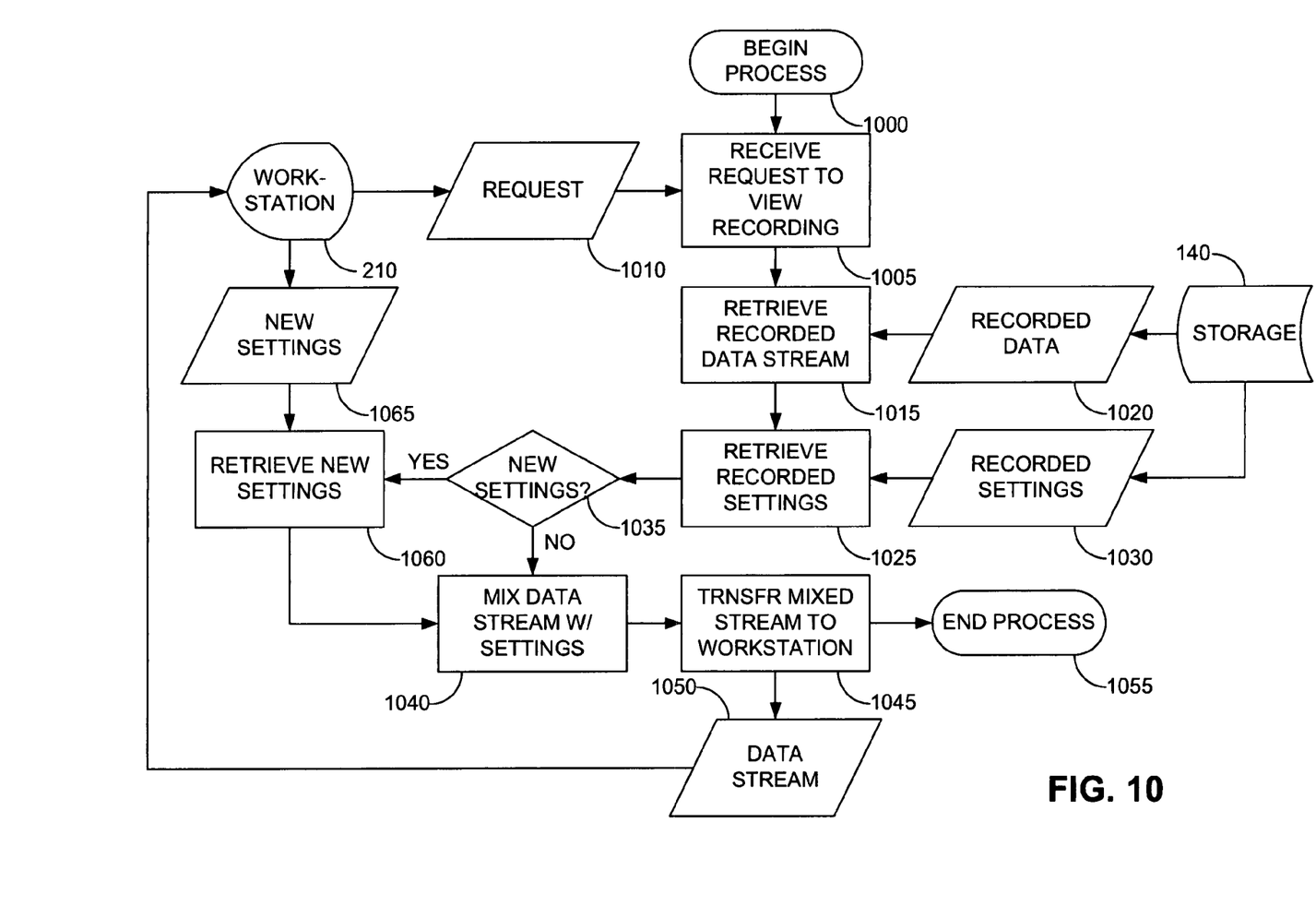
FIG. 10 is a flowchart illustrating a second alternative embodiment of a process for replaying stored data streams.

With reference to FIG. 10, shown is a flowchart illustrating another embodiment of a process used by the server to retrieve stored data streams to present to the user. The process begins at step 1000. At step 1005, the server 120 receives a request 1010 from a workstation 210 to review a previously stored recording. Such a request can indicate a time period for which the user would like to retrieve a data stream related to his or her workstation. However, it should also be recognized that a supervisor, or other authorized personnel, could retrieve a data stream associated with any of the users.

Upon receiving a request 1010 to review a particular stored record, the server 120 retrieves the requested recorded data 1020 from the storage system 140, as shown in step 1015. In some embodiments of the present disclosure, the storage system 140 could begin streaming the data to the server 120, thus acting as a source sending another information data stream to the user. Alternatively, the storage system 140 could transfer the entire file for the specified range to the server 120, and the server could reconstruct the data stream for a particular user. The transfer is often performed over an IP network, however, it should be understood that any physical or logical network layout could be used with respect to the present disclosure. In step 1025, the server 120 retrieves the stored settings 1030 from the storage system 140. It should be recognized that in both cases, the recorded data and the settings data remain stored on the storage system 140, and that a copy is transferred to the server 120 over a network.

In step 1035, the server 120 determines whether the user wishes to change any of the settings associated with the playback of the retrieved data streams. If the user does not desire to change any of the settings, the server 120 mixes the retrieved data streams 1020 in accordance with the retrieved settings 1030, as shown in step 1040. In step 1045, the server 120 transfers the mixed data stream 1050 to the workstation 210. The process ends at step 1055.

However, if the user does desire to change the settings from those retrieved from the storage system 140, the server 120 retrieves new settings 1065 from the workstation 210, as shown in step 1060. The server 120 then mixes the retrieved data streams 1020 in accordance with the new settings 1065, as shown in step 1040. In step 1045, the server 120 transfers the mixed data stream 1050 to the workstation 210. The process ends at step 1055.

The embodiments described above are given as illustrative examples only. It will be readily appreciated that many deviations may be made from the specific embodiments disclosed in this specification without departing from the invention. Accordingly, the scope of the invention is to be determined by claims.

As an illustration of the wide scope of the systems and methods disclosed herein, a system and method can be configured for greater reliability than previous systems that included a typical computer-telephony integration link. It should be noted that previous systems included a computer-telephony integration (CTI) link from a turret to a server which logged call detail information to a database. However, because the CTI link occurs via a different path than the data streams, the CTI link is subject to independent delay or failure. Therefore, the call detail information logged by the CTI link is difficult to correlate with the data streams, and is subject to failure independently from the data stream logging.

As another illustration of the wide scope of the systems and methods of the disclosure, the systems and methods may be provided on many different types of computer-readable media including computer storage mechanisms (e.g., CD-ROM, diskette, RAM, flash memory, computer's hard drive, etc.) that contain instructions for use in execution by a processor to perform the operations of the methods and implement the systems described herein.

As another illustration of the wide scope of the systems and methods of the disclosure, a system and method can be configured to incorporate upgrades in a terminal interface card. For example, increased processing power can enable the terminal interface card to perform many functions not previously performed at the distribution level of the architecture. Previously, recording systems relied on the workstations/turrets to implement much of the processing (mixing, compression, recording, etc.) involved in the recording system. The increased processing power of the terminal interface card can enable the terminal interface card to perform many of the functions previously performed by the workstation/turret, such as, for example, compression and recording functions in addition to the distribution functions previously implemented.

In another illustration of the wide scope of systems and methods of the disclosure, previous systems mixed the data streams prior to compression and storage. Because previous systems mixed the data streams prior to compression, algorithms using higher compression ratios were not efficient in compressing the mixed data signal. The difficulty with using these advanced algorithms arises from the compression model used. The compression model for these advanced algorithms is based on the compression programmer's expectations of the types of sounds that will be encountered. In particular, the advanced algorithms have modeled the human voice, such that the compression algorithm expects to hear a single speaker at a time. When many voice signals are mixed together, the algorithm encounters unexpected sounds/notes and rapidly varying signal levels and background noise. Thus, because the compression model is based on a single voice, there is no capacity in the software to model some of the sounds encountered when multiple signals are mixed together. However, a system and method can be configured to reduce this problem and sometimes eliminate the problem when each of the data streams is separately or independently compressed. Each data stream can comprise fewer voices, and therefore present less opportunity for the compression algorithm to encounter unexpected sounds which cannot be properly modeled by the advanced compression algorithm. In one embodiment of the present disclosure an International Telecommunications Union—Telecom (ITU-T) G.729 standard can be used for compressing the data streams. The use of such advanced compression algorithms further enables the storage system 140 to conserve storage capacity without significantly reducing audio quality.

As another example, a system and method can be configured to use recording logic that enables a recording system to tap the individual source information streams passing through the server. Previously, the signals were mixed by the server before being made available to the recording system. However, tapping the signal after the mixing of the data streams is inefficient because it leads to many superfluous/redundant copies of the same information. Moreover, the quality of such a signal is compromised when compressed using many high compression-ratio algorithms, because the current state of the art in compression models the compression algorithm on human voice or tones. While the signal may include only human voices, several voices on top of each other can create sounds that cannot be efficiently and accurately compressed by state of the art compression technologies because of the potential presence of multiple formant frequencies which can confuse the compression algorithm.

It is noted that the flowchart steps describing computer processes, computer components, software, etc. may be connected directly or indirectly to the other steps such that they enable the flow of the process described herein. In some embodiments of the present disclosure, the term processor includes code that performs software-type functions. This code can take the form of a subroutine, a software task, scripting languages, or any other type of code. It should be understood that processing can be implemented using a distributed architecture. Thus, the software code could be spread across multiple machines in various embodiments of the present disclosure.

The systems' and methods' data (e.g., associations, mappings, etc.) described herein may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program. It should be further noted that the term "logic" (e.g., recording logic) can refer to (1) a process running on a particular piece, or across particular pieces, of hardware, (2) a particular piece of hardware, or a combination of (1) or (2) as the application at hand allows.

The systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

What is claimed is:

1. A device configured to operate upon a server and to record multiple channels of incoming data, the device comprising:
   distribution logic operable to receive information from a plurality of sources, the information including settings retrieved from the plurality of sources, the plurality of sources producing a plurality of data streams, the distribution logic being configured to distribute the plurality of data streams and settings to a plurality of workstations having addresses, the distribution logic using the addresses to distribute the data streams; and
   recording logic configured to reproduce the plurality of data streams, the recording logic being configured to transmit each of the plurality of data streams and the settings along with identification fields comprising the recipient workstation addresses and source addresses of the data streams for storage in a storage device as each of the plurality of data streams are received and distributed by the distribution logic to the plurality of workstations;
   wherein the stored data streams and the stored settings are retrieved from the storage device through the use of the identification fields that are stored with the data streams, wherein the retrieved data streams are provided based upon a request, and
   wherein the workstations have an address and are operable to receive data streams from the distribution logic in accordance with the address, and wherein the recording logic is operable to specify the source levels in the settings such that the independent recordings of the plurality of data streams can be later recreated in accordance with what the user heard in real-time.

2. The system of claim 1, further comprising:
   a primary storage device operable to receive the plurality of data streams from the recording logic and store the plurality of data streams to a non-volatile memory, the plurality of data streams being operable to be subsequently retrieved.

3. The system of claim 2, further comprising:
   a secondary storage device operating in parallel to the primary storage device, receiving the plurality of data streams from the recording logic and storing the plurality of data streams as a transient copy in a volatile memory, the secondary storage device being operable to delete the transient copy upon receiving a signal from the primary storage unit.

4. The system of claim 1, further comprising a storage area network operable to receive the plurality of data streams from the recording logic and store the plurality of data streams to a non-volatile memory.

5. The system of claim 1, wherein a single copy of each different data stream is recorded to a non-volatile memory by the recording logic so as to avoid superfluous copies of the plurality of data streams.

6. The system of claim 1, wherein the recording logic records the plurality of data streams independently using a compression algorithm, the compression algorithm comprising a process operable to efficiently compress a human voice based upon modeling the human voice.

7. The system of claim 6, wherein the compression algorithm compresses the plurality of data sources to about 8 kilobits per second or lower.

8. The system of claim 7, wherein the compression algorithm is a G.729 standard for voice compression.

9. The device of claim 1, wherein the workstations operable to mix the data streams according to source levels set by a user associated with the workstation.

10. The system of claim 9, wherein the recording logic is coupled to the plurality of workstations.

11. The system of claim 10, further comprising playback logic operable to retrieve a plurality of recorded data streams and source levels associated with one of the plurality of users, mix the plurality of recorded data streams responsive to the plurality of source levels associated with one of the plurality of users, and output the result of the mixing to a speaker.

12. The system of claim 10, wherein the user can adjust the source levels during a session, and the recording logic is operable to record the source levels during and after the user adjusts the source levels.

13. The system of claim 1, wherein the recording logic is further operable to record the source of the plurality of data streams enabling the recording logic to reduce superfluous copies of the plurality of data streams.

14. A method of recording a plurality of audio sources for archival and subsequent retrieval, the method comprising the steps of:
   receiving a plurality of audio sources, the plurality of audio sources being respectively associated with inputs and outputs from a plurality of users;
   distributing the plurality of audio sources respectively to a plurality of workstations associated respectively with the plurality of users;
   independently recording each of the plurality of sources to a storage device for subsequent playback as each of the plurality of data streams are received and distributed, thereby reducing superfluous recordings of a particular source among the plurality of audio sources; and
   recording the plurality of audio level settings for a user along with an association with the plurality of audio sources, such that the independently recorded audio sources can be used to reconstruct an audio signal substantially similar to an original mixed signal heard by the user.

15. The method of claim 14, further comprising the step of:
recording in parallel the plurality of audio sources on a primary storage system and a secondary storage system, the primary storage system being operable to write the recording to non-volatile memory, and the secondary storage system being operable to write a transient recording to volatile memory.

16. The method of claim 15, wherein the secondary storage system is operable to perform the steps of:
removing the transient recording from volatile memory responsive to receiving a signal from the primary storage system;
storing the transient recording in non-volatile memory otherwise.

17. The method of claim 14, wherein the step of independently recording the plurality of sources for subsequent playback comprises recording a single instance of the plurality of audio sources for subsequent playback.

18. The method of claim 14, further comprising the steps of:
receiving a plurality of audio level settings from a workstation associated with the user, the audio level settings being associated with the plurality of audio sources to be received by a particular user; and
mixing the plurality of audio sources associated with the user responsive to the plurality of audio level settings.

19. The method of claim 18, further comprising the steps of:
retrieving the plurality of audio sources and the plurality of audio level settings from storage;
mixing the plurality of audio sources responsive to the plurality of audio level settings; and
playing back the result of the mixing step.

20. The method of claim 14, further comprising the step of compressing the plurality of sources prior to the recording step using a compression algorithm, the compression algorithm comprising a process operable to efficiently compress a human voice based upon modeling the human voice.

21. The method of claim 20, wherein the compression algorithm compresses the plurality of data sources to about 8 kilobits per second or lower.

22. The method of claim 21, wherein the compression algorithm is a G.729A standard for voice compression.

23. One or more non-transitory computer readable media having software program code for recording voice traffic associated with a plurality of operator workstations, the program code comprising:
distribution logic operable to receive a plurality of audio streams, the streams being associated with at least one of the plurality of operators, distribution logic being further operable to distribute the plurality of audio streams to those operators associated with the plurality of audio streams;
recording logic operable to tap the plurality of audio streams, the recording logic being further operable to record each of the plurality of audio streams independently to a storage device for subsequent playback as each of the plurality of audio streams are distributed by the distribution logic to the plurality of operators, wherein a number of superfluous copies of the plurality of audio streams is avoided; and
mixing logic coupled to the plurality of audio streams being distributed to the operator, the mixing logic being operable to mix the plurality of audio streams being distributed to the operator in accordance with a plurality of audio level settings set by the operator,
wherein the recording logic is further operable to record the plurality of audio level settings and the audio streams with which the audio level settings are associated, such that a signal originally heard by the operator can be later reconstructed, using the plurality of audio level settings and the plurality of independently recorded audio streams.

24. The non-transistory computer readable media of claim 23, wherein the recording logic is further operable to record the users with whom the plurality of data streams is associated.

25. A method of recording transactions in a trading room environment, the method comprising the steps of:
receiving a plurality of data streams from sources used by traders while making trades;
identifying a recipient trader for the plurality of data streams;
distributing the data stream to the identified recipient trader;
recording the data streams destined for the identified recipient trader with a designation of the identified recipient trader and settings associated with a source used by the identified recipient trader, each of the data streams and settings being recorded on a storage device configured for retrieval of stored data streams as each of the data streams are received and distributed to the identified recipient trader, and to provide the stored data streams over a network to one or more workstations based upon a request that uses the designation; and
wherein the recording step further comprises reducing superfluous copies of the data streams and storage space used by the storage device, and
wherein each of the data streams are recorded having independent source levels specified in the settings such that each of the data streams can be later recreated in accordance with what the identified recipient trader heard in real-time.

* * * * *